United States Patent
Inagaki et al.

(10) Patent No.: US 12,017,598 B2
(45) Date of Patent: Jun. 25, 2024

(54) SIDE COLLISION ENERGY ABSORBING STRUCTURE

(71) Applicants: SHIGERU CO., LTD., Ota (JP); SUBARU CORPORATION, Tokyo (JP)

(72) Inventors: Kenji Inagaki, Ota (JP); Shunya Watanabe, Tokyo (JP)

(73) Assignees: Shigeru Co., LTD., Ota (JP); Subaru Corporation, Tokyo (JP)

( * ) Notice: Subject to any disclaimer, the term of this patent is extended or adjusted under 35 U.S.C. 154(b) by 0 days.

(21) Appl. No.: 18/132,090

(22) Filed: Apr. 7, 2023

(65) Prior Publication Data

US 2023/0365089 A1    Nov. 16, 2023

(30) Foreign Application Priority Data

May 12, 2022    (JP) .................................. 2022-078649

(51) Int. Cl.
*B60R 21/04* (2006.01)
*B60R 21/00* (2006.01)

(52) U.S. Cl.
CPC .. *B60R 21/0428* (2013.01); *B60R 2021/0055* (2013.01)

(58) Field of Classification Search
CPC . B60R 21/04; B60R 21/0428; B60R 21/0421; B60R 21/0414
See application file for complete search history.

(56) References Cited

U.S. PATENT DOCUMENTS

| | | |
|---|---|---|
| 5,934,730 A | 8/1999 | Yagishita et al. |
| 6,036,251 A | 3/2000 | Yagishita et al. |
| 2007/0046073 A1* | 3/2007 | Ludwig ............... B60R 13/0206 296/214 |
| 2010/0007171 A1* | 1/2010 | Tomasu .............. B60R 21/0428 296/146.7 |
| 2015/0115585 A1* | 4/2015 | Smith ................. B60R 21/0428 280/751 |
| 2015/0375692 A1* | 12/2015 | Migaki ............... B60R 13/0243 296/1.08 |
| 2016/0001714 A1* | 1/2016 | Migaki ............... B60R 13/0243 296/193.05 |
| 2018/0257596 A1* | 9/2018 | Migaki .................. B62D 25/02 |
| 2019/0344729 A1* | 11/2019 | Masuda .............. B60R 13/0243 |

FOREIGN PATENT DOCUMENTS

JP    H08-011539 A    1/1996

* cited by examiner

*Primary Examiner* — James A English

(74) *Attorney, Agent, or Firm* — Jodi A. Reynolds, Esq.; Harter Secrest & Emery LLP

(57) ABSTRACT

The present invention provides a side collision energy absorbing structure that gives a good performance while avoiding breakage of a door trim. A side collision energy absorbing structure 2 includes an energy absorber 10 made of molded resin and formed separately from a door trim 1. The energy absorber 10 includes a deformable portion 110 protruded outward in a vehicle width direction and a plurality of mounting flange portions 121, 122, 123 formed in an end portion of the deformable portion 110 on the door trim side. Boss portions 6, 7, 8 of the door trim 1 are respectively inserted and fixed in holes 121*a*, 122*a*, 125 of the mounting flange portions 121, 122, 123. The hole 125 of the mounting flange portion 123 is an elongated hole. The elongated hole 125 extends from where the boss portion 8 is inserted toward the deformable portion 110.

5 Claims, 3 Drawing Sheets

SIDE COLLISION ENERGY ABSORBING STRUCTURE

FIELD OF THE INVENTION

The present invention relates to a structure disposed on a vehicle door trim for absorbing side collision energy to secure safety of occupants.

BACKGROUND OF THE INVENTION

A vehicle door trim is provided with a side collision energy absorbing structure that is buckled or plastically deformed to protect occupants when a side collision occurs. Generally, a side collision energy absorbing structure includes an energy absorber integrally formed with a door trim as shown in FIG. 3 of Patent Document 1 (Japanese Patent Application Publication No. H8-11539). Another energy absorber made of molded resin is formed separately from the door trim and fixed to the door trim with screws or by other means such as welding as shown in FIG. 4 of the Patent Document 1.

SUMMARY OF THE INVENTION

Problem to be Solved by the Invention

With the side collision energy absorbing structure disclosed in FIGS. 3 and 4 of the Patent Document 1, a rapid increase in load in a vehicle width direction applied to the door trim may not be sufficiently suppressed in a process in which the energy absorber is buckled or plastically deformed at the time of side collision, which may lead to damages to the door trim, such as breakage.

Means for Solving the Problems

To solve the problems mentioned above, the present invention provides a side collision energy absorbing structure including: an energy absorber made of molded resin and formed separately from a door trim, the energy absorber including: a deformable portion protruded outward in a vehicle width direction; and a plurality of mounting flange portions formed in an end portion of the deformable portion on the door trim side, the mounting flange portions extending along the door trim, wherein the energy absorber is mounted on the door trim via the plurality of mounting flange portions, wherein at least one of the plurality of mounting flange portions has an elongated hole formed therein, and wherein a boss portion protruded outward from the door trim in the vehicle width direction is inserted in the elongated hole.

According to the features mentioned above, at a time of side collision, at a certain stage of buckling or plastic deformation of the deformable portion of the energy absorber, the mounting flange portion having the elongated hole is moved in an extending direction of the elongated hole and the deformable portion releases a portion of load in the vehicle width direction along the door trim. Therefore, a rapid increase in load in the vehicle width direction can be suppressed, thereby damages to the door trim can be avoided.

In one embodiment, the elongated hole extends toward the deformable portion from a portion of the elongated hole where the boss portion is inserted.

In another embodiment, the direction in which the elongated hole extends makes an acute angle with a straight line connecting the portion of the elongated hole where the boss portion is inserted and a center of the deformable portion.

In another embodiment, the at least one mounting flange portion is fixed to the boss portion and wherein the at least one mounting flange portion is operable to be released from the boss portion when the deformable portion is deformed by an impact of a side collision of a vehicle.

Preferably, the elongated hole includes a circular first hole portion having a same diameter as the boss portion, a second hole portion formed spaced from the first hole portion and having an area not less than that of the first hole portion and a communicating portion connecting the first hole portion and the second hole portion, the communicating portion having a width narrower than the diameter of the first hole portion, and wherein the boss portion is inserted in the first hole portion. According the features mentioned above, the mounting flange portion having the elongated hole can be mounted at an exact location by inserting the boss portion into the first hole portion.

Preferably, of the plurality of mounting flange portions, the other mounting flange portion or portions respectively have circular holes formed therein, wherein a second boss portion or portions protruded outward from the door trim in the vehicle width direction and having same diameters as the circular holes are respectively inserted in the circular holes, and wherein the second boss portion or portions are respectively fixed to the other mounting flange portion or portions. According the features mentioned above, a side collision energy absorbing effect and a load suppressing effect can be optimized by adjusting the number of the mounting flange portions having the elongated hole and the number of the mounting flange portions having the circular hole.

Preferably, the deformable portion having a cup configuration includes a peripheral wall surrounding an entire periphery of the deformable portion and an end wall closing an outer end of the peripheral wall in the vehicle width direction, and wherein the plurality of mounting flange portions are formed in an end portion of the peripheral wall on the door trim side. According the features mentioned above, a shape of the deformable portion can be simplified.

Advantageous Effects of the Invention

According to the side collision energy absorbing structure of the present invention, at a time of side collision, a rapid increase in load applied to the door trim can be suppressed while side collision energy can be sufficiently absorbed. Thereby, damages to the door trim can be avoided.

DETAILED DESCRIPTION OF THE INVENTION

Figure 1:
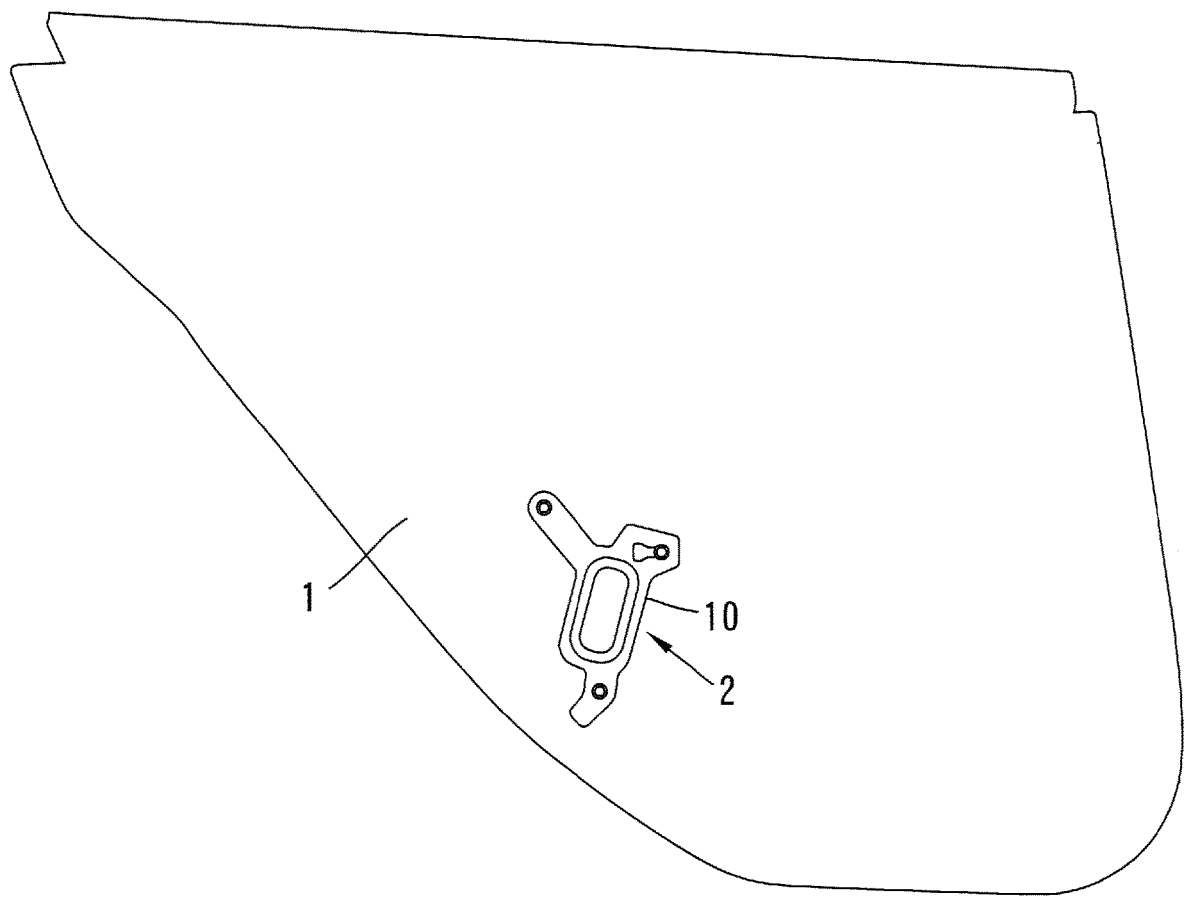
FIG. 1 is a side view of a vehicle door trim including a side collision energy absorbing structure according to one embodiment of the present invention, viewed from outside in a vehicle width direction.

A side collision energy absorbing structure according to one embodiment of the present invention will be described hereinafter with reference to the drawings. As shown in FIG. 1, a door includes a door trim 1 composed of a plurality of molded resin components, a door panel (not shown) disposed outside of the door trim 1 in a vehicle width direction and a side collision energy absorbing structure 2 disposed between the door trim 1 and the door panel at a portion corresponding to a waist portion of occupants.

<Features of the Side Collision Energy Absorbing Structure>

Figure 2:
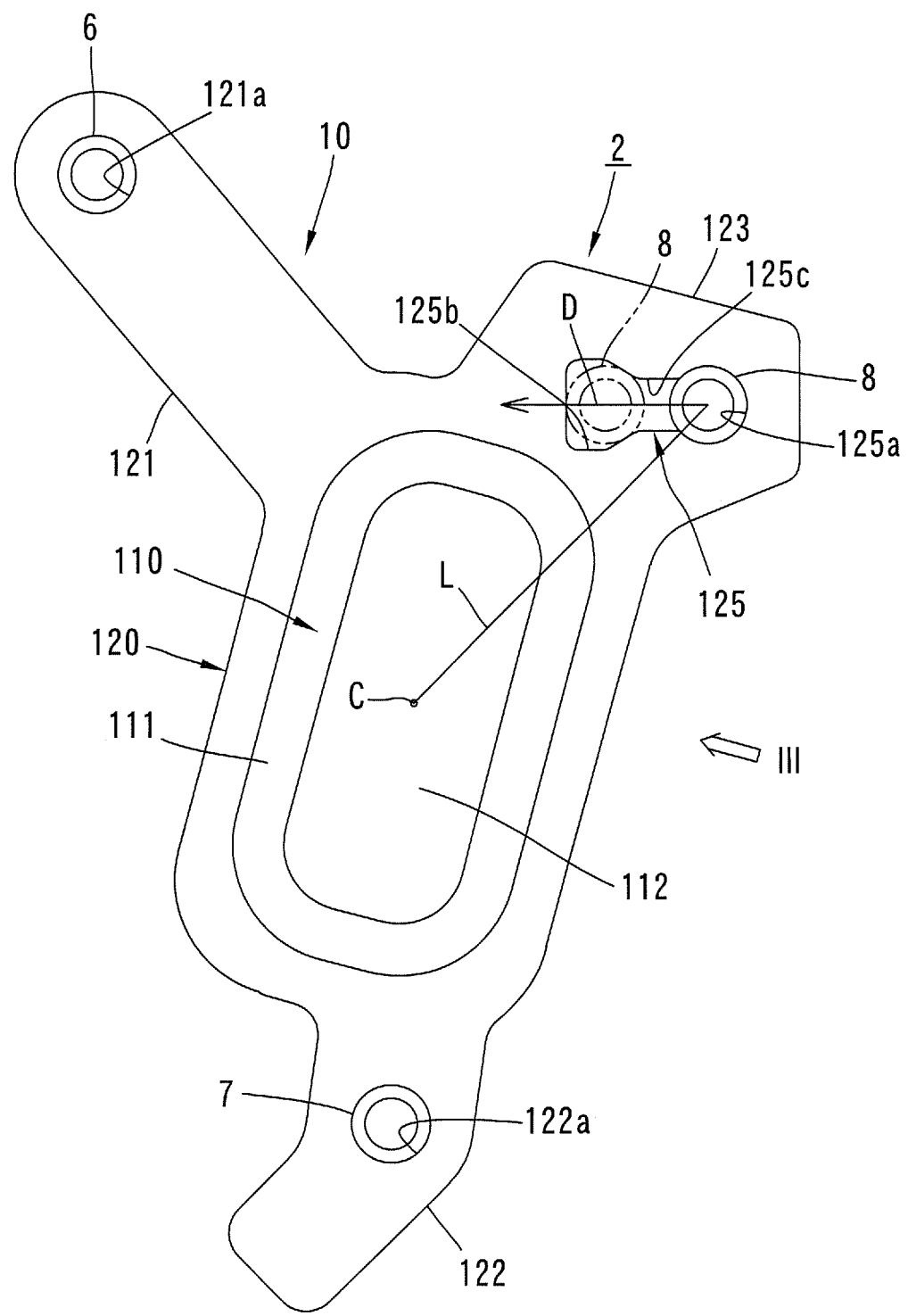
FIG. 2 is an enlarged side view of the side collision energy absorbing structure.
Figure 3:
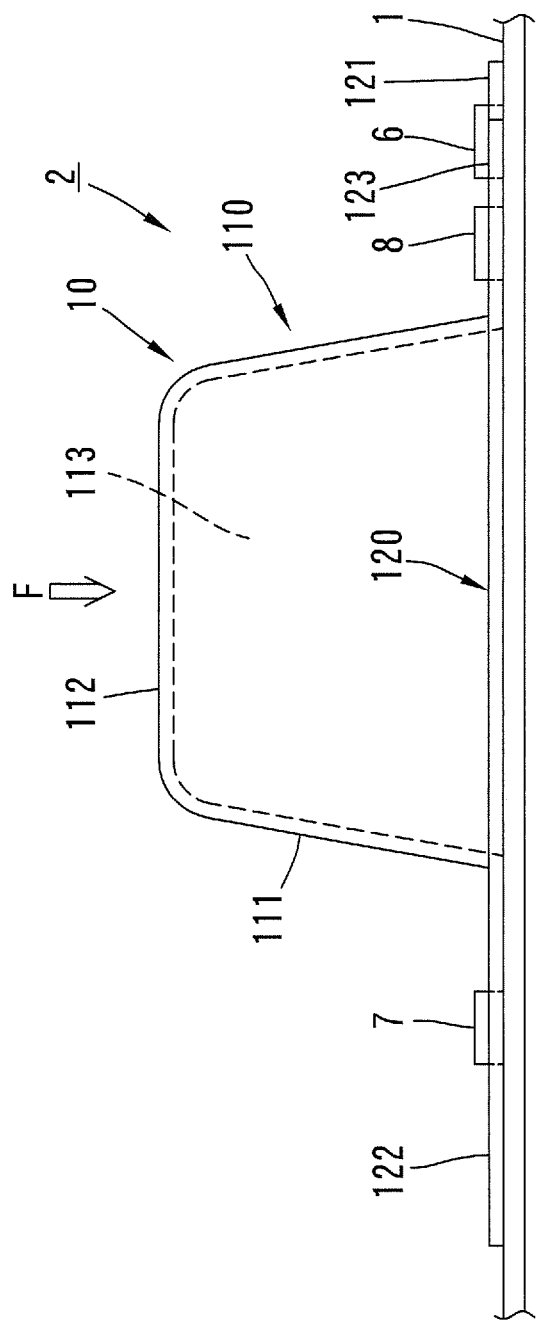
FIG. 3 is a view of the side collision energy absorbing structure, viewed from direction III of FIG. 2.

As shown in FIGS. 2 and 3, the side collision energy absorbing structure 2 includes an energy absorber 10 made of molded resin and formed separately from the door trim 1. The energy absorber 10 includes a deformable portion 110 and a flange 120. The deformable portion 110 having a cup configuration, for example, is protruded outward in the vehicle width direction. The deformable portion 110 includes a peripheral wall 111 surrounding an entire periphery thereof, an end wall 112 closing an outer end of the peripheral wall 111 in the vehicle width direction and an inner space 113. The flange 120 integrally formed in an inner end edge of the peripheral wall 111 in the vehicle width direction over an entire periphery of the peripheral wall 111 extends outward from the deformable portion 110 along the door trim 1.

The flange 120 includes three (a plurality of) extended portions extending in directions away from the deformable portion 110. The extended portions are respectively provided as a first mounting flange portion 121, a second mounting flange portion 122 and a third mounting flange portion 123. The first mounting flange portion 121 is disposed in front of and above the deformable portion 110. The second mounting flange portion 122 is disposed below the deformable portion 110. The third mounting flange portion 123 is disposed in a rear of and above the deformable portion 110.

The first mounting flange portion 121 and the second mounting flange portion 122 respectively have circular holes 121a, 122a formed therein. The third mounting flange portion 123 has an elongated hole 125 extending in a vehicle longitudinal direction, for example, formed therein. The elongated hole 125 includes a circular rear hole portion (first hole portion) 125a, a front hole portion 125b (second hole portion) and a communicating portion 125c connecting the hole portions 125a, 125b. The front hole portion 125b has an area not less than that of the rear hole portion 125a. A width of the communicating portion 125c is narrower than a diameter of the rear hole portion 125a.

As mentioned above, the elongated hole 125 extends forward generally horizontally from the rear hole portion 125a. In other words, as indicated by arrow D of FIG. 2, the elongated hole 125 extends from the rear hole portion 125a toward the deformable portion 110. In this embodiment, an extending direction D of the elongated hole 125 makes an acute angle with respect to a straight line L that extends from the rear hole portion 125a toward a center C of the deformable portion 110.

The side collision energy absorbing structure 2 further includes three (a plurality of) boss portions 6, 7, 8 integrally formed with the door trim 1. The boss portions 6, 7, 8 having circular cylindrical configurations are protruded outward in the vehicle width direction generally orthogonally with the door trim 1. Two boss portions 6, 7 respectively have diameters equal to those of the circular holes 121a, 122a of the first and the second mounting flange portions 121, 122 of the energy absorber 10. The boss portions 6, 7 are respectively inserted in the holes 121a, 122a. The other boss portion 8 has a diameter equal to that of the rear hole portion 125a of the elongated hole 125 of the third mounting flange portion 123. The boss portion 8 is inserted in the hole portion 125a. By these arrangements, the three mounting flange portions 121, 122, 123 of the energy absorber 10 are precisely positioned at predetermined positions.

The energy absorber 10 is mounted on the door trim 1 via the mounting flange portions 121, 122, 123 and the boss portions 6, 7, 8. In a state where the boss portions 6, 7, 8 are respectively inserted in the holes 121a, 122a of the first and the second mounting flange portions 121, 122 and the rear hole portion 125a of the elongated hole 125 of the third mounting flange portion 123, distal end portions of the boss portions 6, 7, 8 are melted and become large diameter portions. The large diameter portions are welded to the mounting flange portions 121, 122, 123. The boss portions 6, 7, 8 shown in FIGS. 2 and 3 are in states before the distal end portions thereof are melted.

In a state where the energy absorber 10 is mounted on the door trim 1, the flange 120 is contacted with a surface of the door trim 1 on the outer side in the vehicle width direction. The end wall 112 of the energy absorber 10 is opposed to the door panel (not shown) in a vicinity of the door panel.

<Working of the Side Collision Energy Absorbing Structure>

At a time of side collision, the side collision energy absorbing structure 2 receives an impact load in the vehicle width direction (indicated by arrow F in FIG. 3) sandwiched between the door panel and the door trim body 1, and absorbs a side collision energy mainly by buckling or plastic deformation of the peripheral wall 111 of the deformable portion 110 of the energy absorber 10.

In a process of the side collision energy absorption, the impact load F in the vehicle width direction is increased. In a latter half of the energy absorbing process, the third mounting flange portion 123 and the boss portion 8 are released from the welded state. It is because a welding strength between the boss portion 8 and the mounting flange portion 123 is much weaker than a lateral load along the door trim 1 generated as the deformable portion 110 is deformed. Consequently, the third mounting flange portion 123 is moved rearward, i.e. to a direction opposite to the extending direction D of the elongated hole 125. In other words, the boss portion 8 is relatively moved forward, i.e. in the extending direction D of the elongated hole 125 with respect to the third mounting flange portion 123 and moved from the rear hole portion 125a to the front hole portion 125b via the communicating portion 125c as indicated by a phantom line of FIG. 2. The first mounting flange portion 121 and the second mounting flange portion 122 are prohibited from being moved because the boss portions 6, 7 are respectively inserted in the circular holes 121a, 122a.

As mentioned above, at the latter half of the side collision energy absorbing process, the third mounting flange portion 123 is moved along the door trim 1. This allows a portion of the load in the vehicle width direction to be released. Thereby, a rapid increase in the load applied to the door trim 1 can be suppressed, and damages to the door trim 1 such as breakage can be avoided.

In the embodiment described above, two flange portions 121, 122 are immovable with respect to the boss portions 6, 7 and one flange portion 123 is movable with respect to the boss portion 8. The number of the flange portions having the elongated hole 125 can be determined as appropriate, and thereby, a side collision energy absorbing effect and a load suppressing effect can be optimized. Elongated holes may be formed in all of the flange portions 121, 122, 123.

Since the deformable portion 110 has a simple cup configuration, cost for forming the energy absorber 10 can be reduced. Further, since the peripheral wall 111 of the deformable portion 110 is deformed accompanying the movement of the flange portion 123 having the elongated hole 125, the load applied to the door trim 1 can be surely released.

The present invention is not limited to the embodiments described above, and various modifications may be adopted. For example, a portion of the flange formed over the entire periphery of the peripheral wall of the energy absorber may be provided as a mounting flange portion. Four or more mounting flange portions may be provided. The mounting flange portion may be fixed to a middle portion of the boss portion in a state where the mounting flange portion is spaced from an outer side surface of the door trim. Instead of welding the boss portion and the mounting flange portion, a screw may be screwed into the boss portion, and the mounting flange portion may be held between a head of the screw and the door trim.

The extending direction (extending direction from a portion into which the boss portion is inserted) of the elongated hole of the mounting flange portion may be coincident with a straight line from the portion into which the boss portion is inserted to the center of the deformable portion.

The invention claimed is:

1. A side collision energy absorbing structure comprising:
an energy absorber made of molded resin and formed separately from a door trim, the energy absorber comprising:
a deformable portion including a peripheral wall, the deformable portion protruded outward in a vehicle width direction; and
a plurality of mounting flange portions formed in an end portion of the peripheral wall on a door trim side, the mounting flange portions extending along the door trim, wherein the energy absorber is mounted on the door trim via the plurality of mounting flange portions,
wherein at least one of the plurality of mounting flange portions has an elongated hole formed therein,
wherein a boss portion protruded outward from the door trim in the vehicle width direction is inserted in the elongated hole, and
wherein the elongated hole extends in a direction from a portion of the elongated hole where the boss portion is inserted toward the deformable portion, and the direction in which the elongated hole extends makes an acute angle with a direction from the portion of the elongated hole where the boss portion is inserted to a center of the deformable portion so as to allow the at least one of the plurality of mounting flange portions to be displaced in a direction away from the deformable portion during deformation of the deformable portion at a time of side collision.

2. The side collision energy absorbing structure according to claim 1, wherein the at least one mounting flange portion is fixed to the boss portion and wherein the at least one mounting flange portion is operable to be released from the boss portion when the deformable portion is deformed by an impact of a side collision of a vehicle.

3. The side collision energy absorbing structure according to claim 1, wherein the elongated hole comprises a circular first hole portion having a same diameter as the boss portion, a second hole portion formed spaced from the first hole portion and having an area not less than that of the first hole portion and a communicating portion connecting the first hole portion and the second hole portion, the communicating portion having a width narrower than the diameter of the first hole portion, and
wherein the boss portion is inserted in the first hole portion.

4. The side collision energy absorbing structure according to claim 1, wherein of the plurality of mounting flange portions, the other mounting flange portion or portions respectively have circular holes formed therein, wherein a second boss portion or portions protruded outward from the door trim in the vehicle width direction and having same diameters as the circular holes are respectively inserted in the circular holes, and wherein the second boss portion or portions are respectively fixed to the other mounting flange portion or portions.

5. The side collision energy absorbing structure according to claim 1, wherein the deformable portion has a cup configuration, the peripheral wall surrounds an entire periphery of the deformable portion and the deformable portion includes an end wall closing an outer end of the peripheral wall in the vehicle width direction.

\* \* \* \* \*